US012562188B2

(12) United States Patent　　(10) Patent No.:　US 12,562,188 B2
Sekiguchi et al.　　　　　　　　(45) Date of Patent:　Feb. 24, 2026

(54) SERVO REPRODUCTION APPARATUS, SERVO REPRODUCTION HEAD, REPRODUCTION HEAD, AND METHOD OF PRODUCING A MAGNETIC TAPE

(71) Applicant: SONY GROUP CORPORATION, Tokyo (JP)

(72) Inventors: Noboru Sekiguchi, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 7 days.

(21) Appl. No.: 18/696,512

(22) PCT Filed: Sep. 30, 2022

(86) PCT No.: PCT/JP2022/036636
§ 371 (c)(1),
(2) Date: Mar. 28, 2024

(87) PCT Pub. No.: WO2023/079870
PCT Pub. Date: May 11, 2023

(65) Prior Publication Data
US 2024/0386911 A1　　Nov. 21, 2024

(30) Foreign Application Priority Data
Nov. 5, 2021　(JP) ................................. 2021-180775

(51) Int. Cl.
*G11B 5/55* (2006.01)
(52) U.S. Cl.
CPC ................................. *G11B 5/5504* (2013.01)

(58) Field of Classification Search
None
See application file for complete search history.

(56) References Cited

U.S. PATENT DOCUMENTS

| | | | | |
|---|---|---|---|---|
| 6,169,640 B1 * | 1/2001 | Fasen | ..................... | G11B 5/584 |
| 6,430,008 B1 * | 8/2002 | Trabert | .................. | G11B 5/584 |

(Continued)

FOREIGN PATENT DOCUMENTS

| | | |
|---|---|---|
| JP | 2008-542969 A | 11/2008 |
| JP | 2014-199706 A | 10/2014 |

(Continued)

OTHER PUBLICATIONS

Search Report issued in International Patent Application No. PCT/JP2022/036636, mailed Dec. 20, 2022 and English translation of same. 5 pages.

(Continued)

*Primary Examiner* — William J Klimowicz
(74) *Attorney, Agent, or Firm* — K&L Gates LLP

(57) ABSTRACT

A servo reproduction apparatus according to the present technology includes: a servo reproduction head. The servo reproduction head includes a first reproduction head portion and a second reproduction head portion. The first reproduction head portion reads a servo pattern recorded on a plurality of first servo bands, which are some of a plurality of servo bands in a magnetic tape including the plurality of servo bands. The second reproduction head portion reads a servo pattern recorded on a plurality of second servo bands, which are others of the plurality of servo bands.

19 Claims, 12 Drawing Sheets

(56) References Cited

U.S. PATENT DOCUMENTS

| | | | | |
|---|---|---|---|---|
| 8,780,486 B2 * | 7/2014 | Bui | .................. | G11B 20/10398 |
| 2005/0018349 A1 * | 1/2005 | Eaton | ...................... | G11B 5/127 |
| 2006/0274446 A1 | 12/2006 | Johnson et al. | | |
| 2008/0068751 A1 * | 3/2008 | Biskeborn | .......... | G11B 5/00826 |
| 2008/0117542 A1 * | 5/2008 | Bui | ........................ | G11B 5/584 |
| 2014/0268409 A1 | 9/2014 | Bui et al. | | |
| 2019/0272851 A1 * | 9/2019 | Bui | ...................... | G11B 5/5926 |
| 2021/0295868 A1 * | 9/2021 | Kataguchi | .............. | G11B 5/735 |
| 2022/0284923 A1 * | 9/2022 | Yamaga | ............... | G11B 5/7356 |

FOREIGN PATENT DOCUMENTS

| | | | | | |
|---|---|---|---|---|---|
| JP | 2021034113 A | * | 3/2021 | ........... | G11B 5/7356 |
| JP | 2021-114352 A | | 8/2021 | | |

OTHER PUBLICATIONS

Written Opinion issued in International Patent Application No. PCT/JP2022/036636, mailed Dec. 20, 2022. 4 pages.

* cited by examiner

| | Servo band | | | | Servo reproduction head | | | | | | | Properties | | |
|---|---|---|---|---|---|---|---|---|---|---|---|---|---|---|
| | Interval [pitch] (um) | Width (um) | Element type | Element interval [pitch] (um) | Head length (mm) | Gap central portion readability | Surface low-friction processing | Individual | Number of reproduction head portions | Arrangement order | Position adjustment mechanism | Supportability for simultaneous reading of all servo bands | Reproduction head friction increase | Magnetic tape travelling stability |
| Comparative Example1 | 2859 | 93 | Inductive | 2859 | 18.8 | Possible | Without | a, b | 1 | ∧ | With | Possible | Normal | Stable |
| Comparative Example2 | 1280 | 93 | Inductive | 1280 | 18.8 | Possible | Without | a, b | 1 | ∧ | With | Not possible | Normal | Stable |
| Comparative Example3 | 980 | 93 | Inductive | 980 | 18.8 | Possible | Without | a, b | 1 | ∧ | With | Not possible | Normal | Stable |
| Example1 | 1280 | 93 | Inductive | 2560 | 19.3 | Possible | Without | a, b | 2 | ∧∧ | With | Possible | High | Stable |
| Example2 | 980 | 93 | Inductive | 1960 | 19.3 | Possible | Without | a, b | 2 | ∧∧ | With | Possible | High | Stable |
| Comparative Example4 | 600 | 93 | Inductive | 1200 | 19.3 | Possible | Without | a, b | 2 | ∧∧ | With | Not possible | High | Stable |
| Example3 | 600 | 93 | Inductive | 1800 | 19.3 | Possible | Without | a, b | 3 | ∧∧∧ | With | Possible | Even higher | Stable |
| Comparative Example5 | 1280 | 93 | Inductive | 2560 | 18.8 | Possible | Without | a, b | 2 | ∧∧ | With | Possible | High | Unstable |
| Example4 | 1280 | 70 | Inductive | 2560 | 19.3 | Not possible | Without | a, b | 2 | ∧∧ | With | Possible | High | Stable |
| Example5 | 1280 | 93 | Inductive | 2560 | 19.3 | Possible | Without | a, b | 2 | ∧∧ | With | Possible | High | Stable |
| Example6 | 1280 | 93 | MR | 2560 | 19.3 | Possible | Without | a, b | 2 | ∧∧ | With | Possible | High | Stable |
| Example7 | 1280 | 93 | Inductive | 2560 | 19.3 | Possible | Without | a, b | 2 | ∧∧ | With | Possible | High | Stable |
| Example8 | 1280 | 93 | Inductive | 2560 | 19.3 | Possible | With | a, b | 2 | ∧∧ | With | Possible | Normal | Stable |

FIG.6

FIG.7
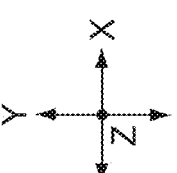
30
31
32
(32a) (32b)
32
(32b)
32
(32a)
23
(23a) (23b)
23
(23a)
23
(23b)
Servo band #0
Data band #3
Servo band #1
Data band #1
Servo band #2
Data band #0
Servo band #3
Data band #2
Servo band #4
Data track locations
Data track locations
Data track locations
Data track locations
Tape edge guard band
Servo band pitch
Servo band width
Forward (BOT to EOT)
Tape motion
Tape edge guard band
Y
X
Z

Tape edge guard band

Servo band pitch

Servo band width

Forward (BOT to EOT)
Tape motion

Tape edge guard band

Servo band #0
Data band #7
Data track locations
Servo band #1
Data band #5
Data track locations
Servo band #2
Data band #3
Data track locations
Servo band #3
Data band #1
Data track locations
Servo band #4
Data band #0
Data track locations
Servo band #5
Data band #2
Data track locations
Servo band #6
Data band #4
Data track locations
Servo band #7
Data band #6
Data track locations
Servo band #8

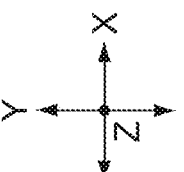

X

Y

Z

SERVO REPRODUCTION APPARATUS, SERVO REPRODUCTION HEAD, REPRODUCTION HEAD, AND METHOD OF PRODUCING A MAGNETIC TAPE

TECHNICAL FIELD

The present technology relates to a technology such as a servo reproduction apparatus that reads and reproduces a servo pattern recorded on a magnetic tape.

BACKGROUND ART

A plurality of data bands on which data is recorded and a plurality of servo bands on which a servo pattern is recorded are provided in a magnetic tape. In the magnetic tape, first, a servo pattern is recorded on the servo band by a servo write head of a servo recording/reproduction apparatus (see, for example, Patent Literature 1).

Next, the servo pattern recorded on the servo band is read and reproduced by a servo reproduction head of the servo recording/reproduction apparatus. Information regarding the reproduced servo pattern is used as information for checking whether or not the servo pattern has been accurately recorded.

CITATION LIST

Patent Literature

Patent Literature 1: Japanese Patent Application Laid-open No. 2014-199706

DISCLOSURE OF INVENTION

Technical Problem

Due to the demand for higher-density recording on magnetic tapes, the number of servo bands has increased and the pitch between servo bands has tended to be narrower. When the pitch between servo bands becomes narrower, there is a problem that the servo pattern cannot be accurately read by the servo reproduction head.

In view of the circumstances as described above, it is an object of the present technology to provide a technology that makes it possible for a servo reproduction head to accurately read a servo pattern even in the case where a pitch between servo bands is narrow.

Solution to Problem

A servo reproduction apparatus includes: a servo reproduction head.

The servo reproduction head includes a first reproduction head portion and a second reproduction head portion.

The first reproduction head portion reads a servo pattern recorded on a plurality of first servo bands, which are some of a plurality of servo bands in a magnetic tape including the plurality of servo bands.

The second reproduction head portion reads a servo pattern recorded on a plurality of second servo bands, which are others of the plurality of servo bands.

As a result, the reading of the servo pattern can be shared by two or more reproduction head portions for each servo band group. Therefore, for example, even if the number of servo bands increases and the pitch between servo bands becomes narrower for higher-density recording of data, it is possible to accurately read servo patterns in all servo bands.

In the servo reproduction apparatus, when the plurality of servo bands is sequentially numbered in a width direction of the magnetic tape, the first reproduction head portion may read a servo pattern recorded on the plurality of first servo bands corresponding to first numbers (e.g., even numbers) that increment by at least two.

In the servo reproduction apparatus, the second reproduction head portion may read a servo pattern recorded on the plurality of second servo bands corresponding to second numbers (e.g., odd numbers) that increment by at least two and are different from the first numbers.

In the servo reproduction apparatus, the plurality of servo bands may be arranged at a first pitch in a width direction of the magnetic tape, the first reproduction head portion and the second reproduction head portion may have a length direction in the width direction of the magnetic tape, and the first reproduction head portion and the second reproduction head portion may be servo elements that read the servo pattern, and may each include a plurality of servo elements arranged at a second pitch that is an integral multiple and twice or more of the first pitch in the length direction of the corresponding reproduction head portion.

In the servo reproduction apparatus, the first reproduction head portion and the second reproduction head portion may have a length direction in a width direction of the magnetic tape, and the first reproduction head portion and the second reproduction head portion may be arranged such that positions of the respective reproduction head portions in the length direction are shifted.

In the servo reproduction apparatus, the first reproduction head portion and the second reproduction head portion may have a width direction in a length direction of the magnetic tape, the first reproduction head portion and the second reproduction head portion may each have a facing surface that includes a first region and a second region and faces the magnetic tape, the first region corresponding to a position where the servo element is provided in the length direction of the corresponding reproduction head portion, the second region corresponding to a position where the servo element is not provided in the length direction of the corresponding reproduction head portion, and a width of the second region in the width direction of the corresponding reproduction head portion may be narrower than a width of the first region on the facing surface, or a plurality of grooves that is along the width direction of the corresponding reproduction head portion and arranged in the length direction of the corresponding reproduction head portion may be formed in the second region on the facing surface.

In the servo reproduction apparatus, the plurality of servo bands may be arranged at a first pitch in a width direction of the magnetic tape, and the first pitch may be 1280 μm or less.

In the servo reproduction apparatus, the magnetic tape may have a width of 12.656 mm or less in a width direction of the magnetic tape.

In the servo reproduction apparatus, the magnetic tape may include 9 or more servo bands.

In the servo reproduction apparatus, each of the plurality of servo bands may have a width of 93 μm or less in a width direction of the magnetic tape.

In the servo reproduction apparatus, the first reproduction head portion and the second reproduction head portion may have a length direction in a width direction of the magnetic tape, and each of the first reproduction head portion and the second reproduction head portion may have a length of 19.3 mm or more in the length direction of the corresponding reproduction head portion.

In the servo reproduction apparatus, the first reproduction head portion and the second reproduction head portion may each be of an inductive type.

In the servo reproduction apparatus, the servo pattern may include a first servo pattern inclined at a first azimuth angle with respect to a width direction of the magnetic tape and a second servo pattern inclined at a second azimuth angle opposite to the first azimuth angle with respect to the width direction of the magnetic tape.

In the servo reproduction apparatus, the first reproduction head portion and the second reproduction head portion may read the servo pattern at both end portions of the first servo pattern and the second servo pattern excluding a central portion.

In the servo reproduction apparatus, the first reproduction head portion may include the first reproduction head that reads the first servo pattern and a second reproduction head that reads the second servo pattern in the plurality of first servo bands, and the second reproduction head portion may include the third reproduction head that reads the first servo pattern and a fourth reproduction head that reads the second servo pattern in the plurality of second servo bands.

In the servo reproduction apparatus, the first reproduction head portion and the second reproduction head portion may have a width direction in a length direction of the magnetic tape, the two reproduction heads of the first reproduction head portion may be adjacent to each other in the width direction of the corresponding reproduction head portion, and the two reproduction heads of the second reproduction head portion may be adjacent to each other in the width direction of the corresponding reproduction head portion.

In the servo reproduction apparatus, the first reproduction head portion and the second reproduction head portion may have a width direction in a length direction of the magnetic tape, and the two reproduction heads of at least one of the first reproduction head portion or the second reproduction head portion are not necessarily need to be adjacent to each other in the width direction of the corresponding reproduction head portion.

A servo reproduction head according to the present technology includes: a first reproduction head portion; and a second reproduction head portion.

The first reproduction head portion reads a servo pattern recorded on a plurality of first servo bands, which are some of a plurality of servo bands in a magnetic tape including the plurality of servo bands.

The second reproduction head portion reads a servo pattern recorded on a plurality of second servo bands, which are others of the plurality of servo bands.

A reproduction head according to the present technology is a reproduction head, including a plurality of servo elements each reading a servo pattern recorded on a plurality of servo bands in a magnetic tape including the plurality of servo bands, the reproduction head having a length direction in a width direction of the magnetic tape and a width direction in a length direction of the magnetic tape, the reproduction head having a facing surface that includes a first region and a second region and faces the magnetic tape, the first region corresponding to a position where the servo element is provided in the length direction of the reproduction head, the second region corresponding to a position where the servo element is not provided in the length direction of the reproduction head, and a width of the second region in the width direction of the reproduction head being narrower than a width of the first region in the first direction on the facing surface, or a plurality of grooves that is along the width direction of the reproduction head and arranged in the length direction of the reproduction head being formed in the second region on the facing surface.

A method of producing a magnetic tape according to the present technology includes: reading, by a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, the servo pattern; and checking, on a basis of information regarding the read servo pattern, whether or not the servo pattern has been accurately written.

BRIEF DESCRIPTION OF DRAWINGS

FIG. 6 is a diagram showing Examples and Comparative Examples according to the present technology.

FIG. 7 is a plan view showing a relationship between a servo reproduction head and a servo band according to Comparative Example as viewed from the side of the servo reproduction head facing the magnetic tape.

FIG. 9 is a plan view showing a relationship between a servo reproduction head and a servo band according to still another Comparative Example as viewed from the side of the servo reproduction head facing the magnetic tape.

MODE(S) FOR CARRYING OUT THE INVENTION

Figure 1:
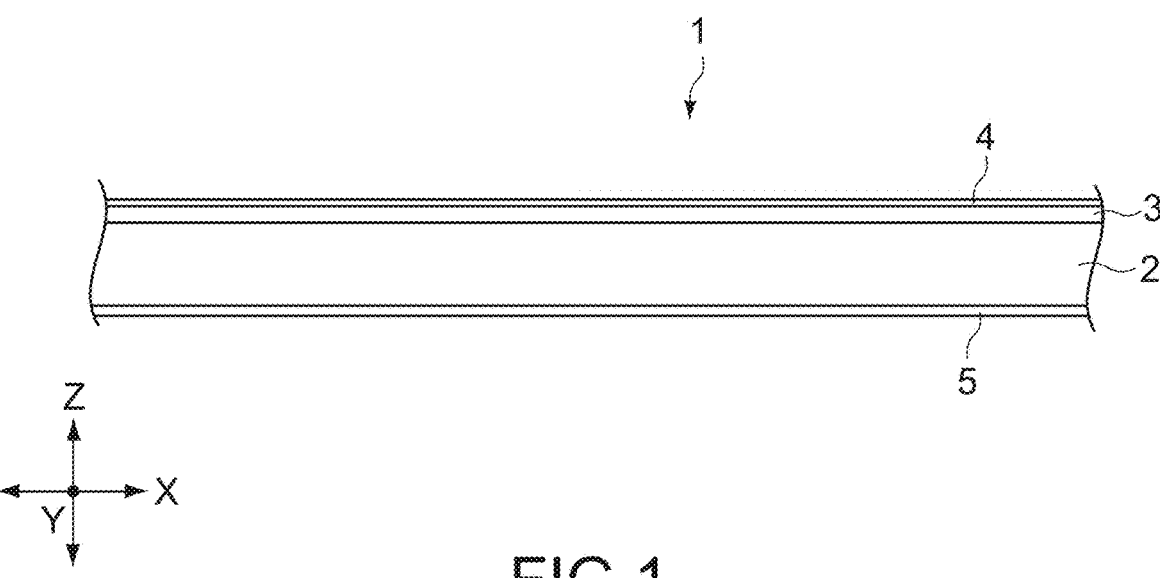
FIG. 1 is a schematic diagram of a magnetic tape as viewed from the side.

Hereinafter, embodiments according to the present technology will be described with reference to the drawings.
<<First Embodiment>>
<Configuration of Magnetic Tape 1>
First, a basic configuration of a magnetic tape 1 according to a first embodiment of the present technology will be described. FIG. 1 is a schematic diagram of the magnetic tape 1 as viewed from the side, and FIG. 2 is a schematic diagram of the magnetic tape 1 as viewed from above.

Figure 2:
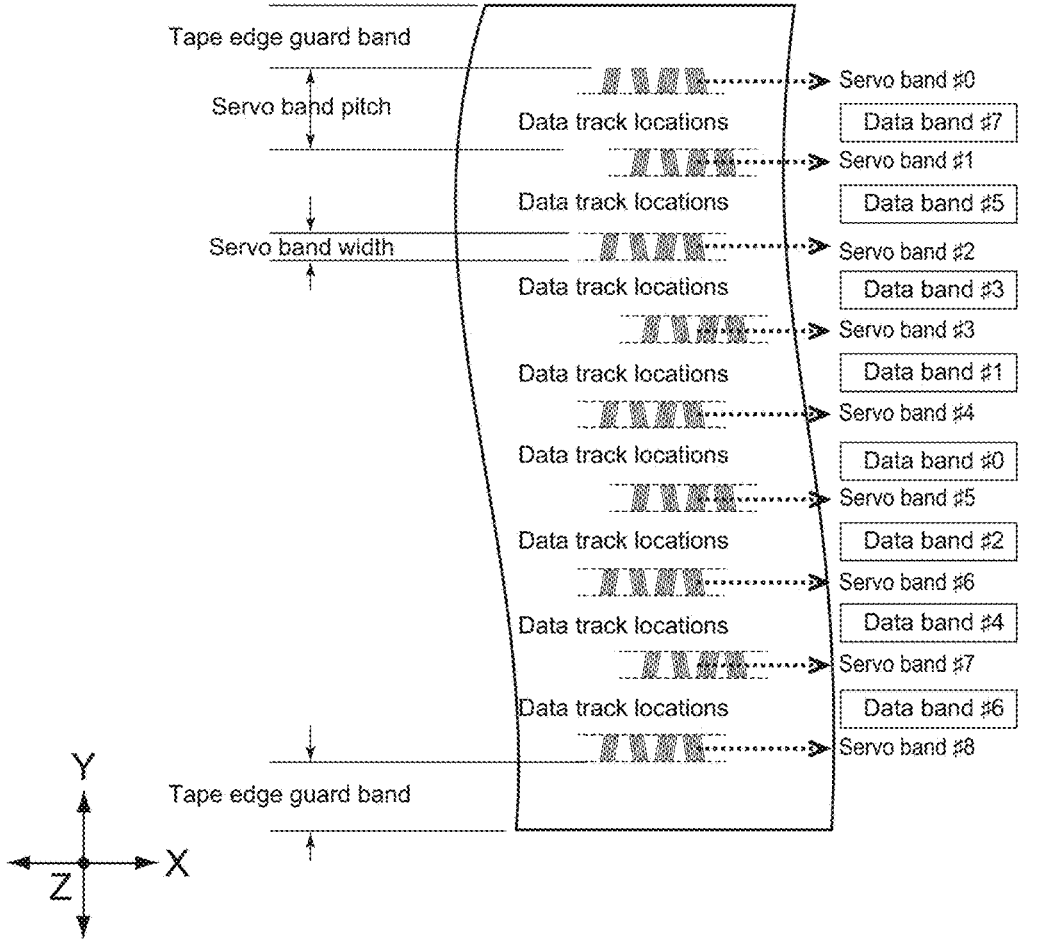
FIG. 2 is a schematic diagram of the magnetic tape as viewed from above.

As shown in FIG. 1 and FIG. 2, the magnetic tape 1 has a tape shape that is long in a length direction (X-axis direction), short in a width direction (Y-axis direction), and thin in a thickness direction (Z-axis direction).

The magnetic tape 1 includes a base material 2 having a tape shape that is long in the length direction (X-axis direction), a non-magnetic layer 3 provided on one main surface of the base material 2, a magnetic layer 4 provided on the non-magnetic layer 3, and a back layer 5 provided on the other main surface of the base material 2. Note that the back layer 5 only needs to be provided as necessary, and this back layer 5 may be omitted.

The base material 2 is a non-magnetic support that supports the non-magnetic layer 3 and the magnetic layer 4. The base material 2 contains, for example, at least one of polyesters, polyolefins, cellulose derivatives, vinyl resins, and another polymer resins.

The magnetic layer 4 is a recording layer for recording data. The magnetic layer 4 is formed on the non-magnetic layer 3 or the base material 2 by, for example, application or sputtering. The magnetic layer 4 may include a magnetic powder, a binder, conductive particles, and the like. The magnetic layer 4 may further include an additive such as a lubricant, an abrasive, and a rust inhibitor as necessary.

The magnetic layer 4 may be perpendicularly oriented or longitudinally oriented. The magnetic powder included in the magnetic layer 4 include, for example, nanoparticles containing ε-iron oxide (ε-iron oxide particles), nanoparticles containing hexagonal ferrite (hexagonal ferrite particles), nanoparticles containing Co-containing spinel ferrite (cobalt ferrite), or the like.

The non-magnetic layer 3 may include a non-magnetic powder and a binder. The non-magnetic layer 3 may include an additive such as conductive particles, a lubricant, a curing agent, and a rust prevention material as necessary. Note that the non-magnetic layer 3 may be omitted (e.g., in the case where the magnetic layer 4 is formed on the base material 3 by sputtering).

The back layer 5 includes a non-magnetic powder and a binder. The back layer 5 may include an additive such as a lubricant, a curing agent, and an antistatic agent as necessary.

In this embodiment, the width of the magnetic tape 1 (Y-axis direction) is, for example, 12.656 mm (approximately ½ inch) or less. Note that the width of the magnetic tape 1 may be 25.4 mm (1 inch) or less, and the size may be appropriately changed.

As shown in FIG. 2, the magnetic layer 4 includes a plurality of data bands (data bands #0 to #7), a plurality of servo bands (servo bands #0 to #8), and two guard bands.

The data band is an area where data is written (region including a plurality of recording tracks), and the servo band is an area where a predetermined servo pattern is written. Further, the guard bands are margin areas provided at both ends of the magnetic tape 1 in the width direction.

The data band, the servo band, and the guard band each have a shape that is long in the length direction (X-axis direction) and short in the width direction (Y-axis direction), and area aligned in the width direction. Further, the servo bands are arranged at positions sandwiching the respective data bands in the width direction (Y-axis direction).

In this embodiment, the number of data bands is, for example, 8 or more, and the number of servo bands is, for example, 9 or more. The number of data bands and the number of servo bands are not limited thereto, and may be appropriately changed.

Further, the width of the servo band (Y-axis direction) is, for example, 93 μm or 70 μm or less. Further, the pitch between servo bands in the width direction (Y-axis direction) of the magnetic tape 1 is, for example, 1280 μm or less. The width of the servo band and the pitch between servo bands are not limited thereto and may be appropriately changed.

The servo pattern recorded on the servo band includes a first servo pattern ("/") inclined at a first azimuth angle with respect to the width direction (Y-axis direction) and a second servo pattern ("\") inclined at a second azimuth angle opposite to the first azimuth angle with respect to the width direction.

<Configuration of Entire Servo Recording/Reproduction Apparatus 100 and Configurations of Respective Units>

Figure 3:
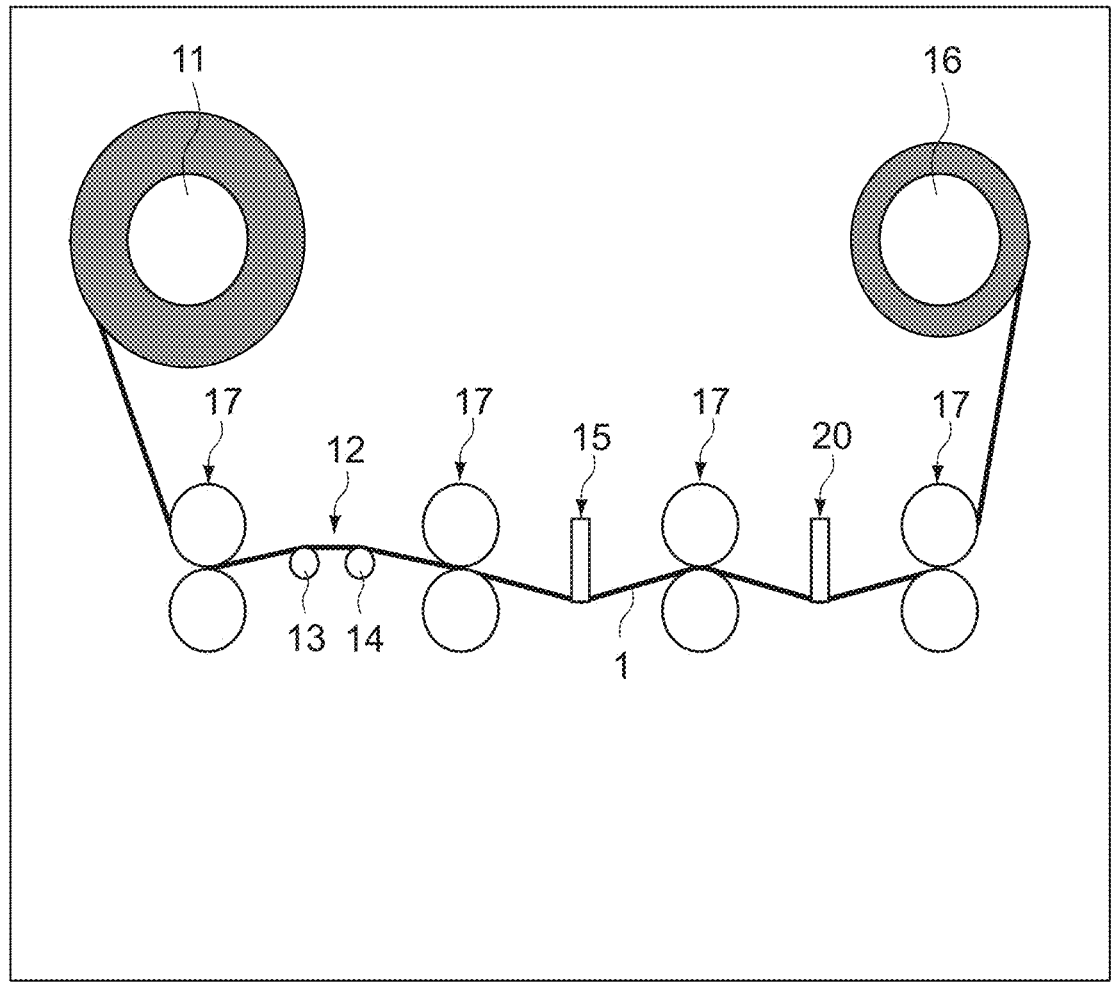
FIG. 3 is a diagram showing a servo recording/reproduction apparatus according to a first embodiment of the present technology.

Next, a servo recording/reproduction apparatus 100 according to a first embodiment of the present technology will be described. FIG. 3 is a diagram showing the servo recording/reproduction apparatus 100 according to the first embodiment of the present technology.

As shown in FIG. 3, the servo recording/reproduction apparatus 100 (servo reproduction apparatus) includes a feed roller 11, a demagnetizing unit 12, a servo write head 15, a servo reproduction head 20, a winding roller 16, and four pairs of capstan rollers 17.

The feed roller 11 is capable of rotatably supporting the rolled magnetic tape 1. The feed roller 11 rotates in accordance with driving of a motor or the like, and feeds out the magnetic tape 1 toward the downstream side in accordance with the rotation.

The winding roller 16 is capable of rotatably supporting the rolled magnetic tape 1. The winding roller 16 rotates in accordance with driving of a motor or the like, and winds up the magnetic tape 1 in accordance with the rotation.

The four pairs of capstan rollers 17 are each capable of sandwiching the magnetic tape 1 from both sides in the up-and-down direction. The four pairs of capstan rollers 17 rotate in accordance with driving of a motor or the like, and convey the magnetic tape 1 along the conveying path in accordance with the rotation.

The feed roller 11, the winding roller 16, and the four pairs of capstan rollers 17 are capable of conveying the magnetic tape 1 at a constant speed in the conveying path.

The servo write head 15 is disposed, for example, above (on the side of the magnetic layer 4) the magnetic tape 1. The servo write head 15 applies a magnetic field to the servo band at predetermined timing in accordance with a pulse signal of a square wave to record a servo pattern on the servo band.

The servo write head 15 is capable of recording servo patterns on all servo bands (#0 to #8) when the magnetic tape 1 passes below the servo write head 15.

The demagnetizing unit 12 is disposed, for example, on the upstream side of the servo write head 15 and below the magnetic tape 1 (on the side of the base material 2). The demagnetizing unit 12 includes, for example, two permanent magnets 13 and 14. The permanent magnets 13 and 14 apply, before the servo write head 15 records a servo pattern, a magnetic field to the entire magnetic layer 4 by a DC magnetic field to demagnetize the entire magnetic layer 4.

The servo reproduction head 20 is disposed on the downstream side of the servo write head 15 and above the magnetic tape 1 (on the side of the magnetic layer 4). The servo reproduction head 20 is configured to be capable of reproducing information of a servo pattern by reading the magnetic field generated from the servo pattern recorded on the magnetic tape.

The servo reproduction head 20 is capable of reading servo patterns from all servo bands (#0 to #8) when the magnetic tape 1 passes below the servo reproduction head 20. The information of the servo pattern read by the servo reproduction head 20 is transmitted to a control unit described below. The control unit checks, on the basis of the information of the servo pattern read by the servo reproduction head 20, whether or not the servo pattern has been accurately recorded.

Examples of the type of servo reproduction head 20 include an inductive type, an MR type (Magneto Resistive), a GMR type (Giant Magneto Resistive), and a TMR type (Tunnel Magneto Resistive). Note that details of the configuration of the servo reproduction head 20 will be described below.

Note that although illustration is omitted, the servo recording/reproduction apparatus 100 includes a control device that integrally controls the respective units of the servo recording/reproduction apparatus 100.

The control device includes, for example, a control unit, a storage unit, a communication unit, and the like. The control unit is configured by, for example, a CPU (Central Processing Unit) or the like, and integrally controls the respective units of the servo recording/reproduction apparatus 100 in accordance with a program stored in the storage unit.

The storage unit includes a non-volatile memory on which various types of data and various programs are recorded, and a volatile memory to be used as a work area of the control unit. The above various programs may be read from a portable recording medium such as an optical disc and a semiconductor memory, or may be downloaded from a server apparatus on a network. The communication unit is configured to be capable of communicating with, for example, another apparatus such as a server apparatus.

<Servo Reproduction Head 20>

Figure 4:
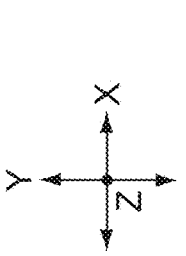
FIG. 4 is a plan view showing a relationship between a servo reproduction head and a servo band as viewed from the side of the servo reproduction head facing the magnetic tape.
Figure 5:
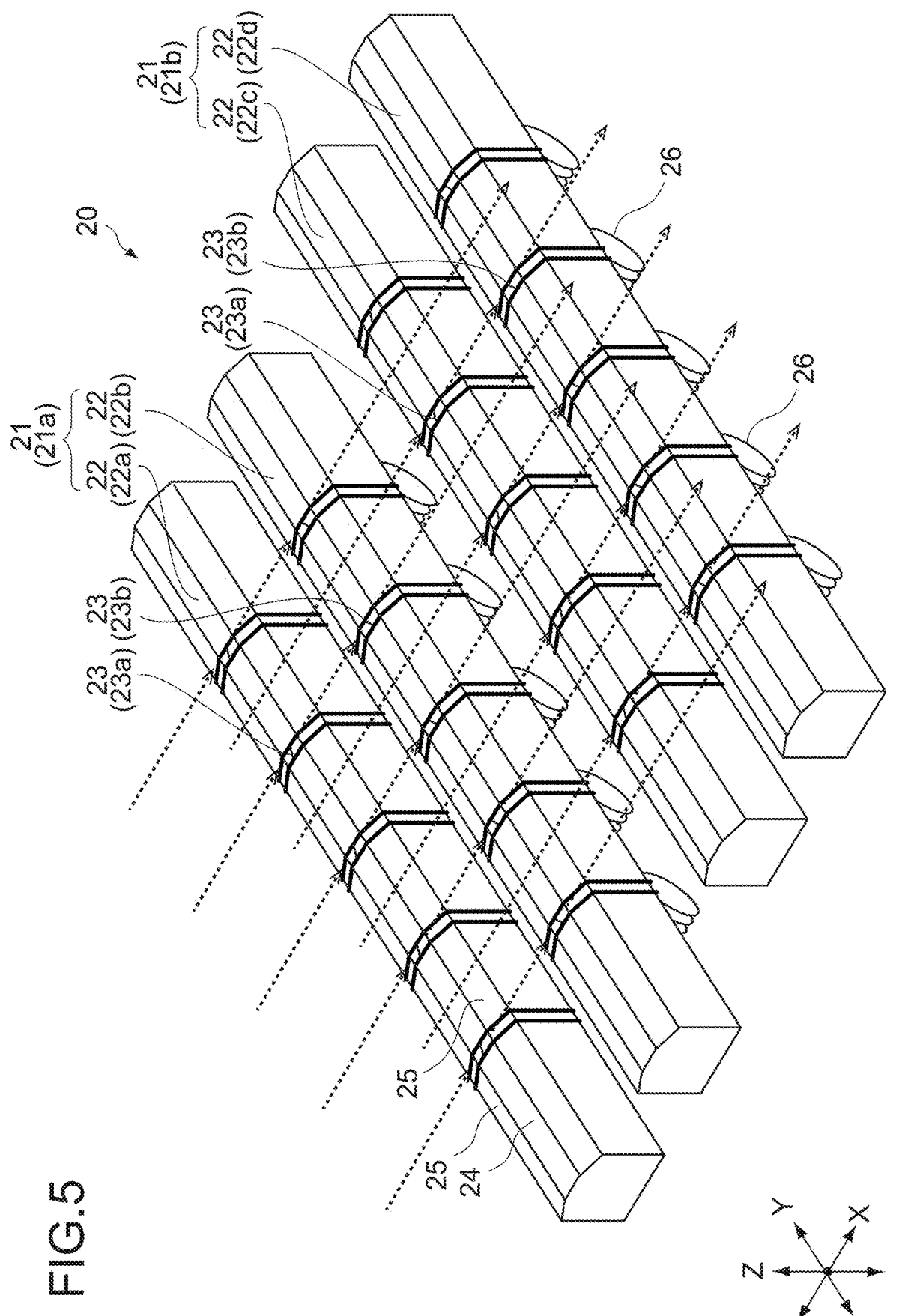
FIG. 5 is a perspective view of the servo reproduction head as viewed from the side facing the magnetic tape.

Next, details of the servo reproduction head 20 will be described. FIG. 4 is a plan view showing a relationship between the servo reproduction head 20 and the servo band as viewed from the side of the servo reproduction head 20 facing the magnetic tape 1. FIG. 5 is a perspective view of the servo reproduction head 20 as viewed from the side facing the magnetic tape.

As shown in FIG. 4 and FIG. 5, the servo reproduction head 20 includes a first reproduction head portion 21a and a second reproduction head portion 21b. Note that the number of reproduction head portions 21 may be three or more.

In FIG. 4 and FIG. 5, the magnetic tape 1 is flowing from the left side to the right side. Therefore, in this example, the first reproduction head portion 21a is disposed on the upstream side in the conveying direction of the magnetic tape 1, and the second reproduction head portion 21b is disposed on the downstream side in the conveying direction of the magnetic tape 1.

The first reproduction head portion 21a is configured to be capable of reading a servo pattern recorded on a plurality of first servo bands (#0, #2, #4, #6, and #8), which are some of all servo bands (#0 to #8) in the magnetic tape 1.

Typically, the first reproduction head portion 21a is capable of reading a servo pattern recorded on a plurality of first servo bands (#0, #2, #4, #6, and #8) corresponding to first numbers (#0, #2, #4, #6, and #8) that increment by two when all servo bands are sequentially numbered in the width direction of the magnetic tape 1.

Meanwhile, the second reproduction head portion 21b is configured to be capable of reading a servo pattern recorded on a plurality of second servo bands (#1, #3, #5, and #7), which are others of all servo bands (#0 to #8).

Typically, the second reproduction head portion 21b is capable of reading a servo pattern recorded on a plurality of second servo bands (#1, #3, #5, and #7) corresponding to second numbers (#1, #3, #5, and #7) that increment by two and are different from the first numbers.

The first reproduction head portion 21a and the second reproduction head portion 21b are capable of jointly reading a servo pattern in all servo bands (#0 to #8).

The first reproduction head portion 21a and the second reproduction head portion 21b have similar configurations. Further, the first reproduction head portion 21a and the second reproduction head portion 21b are arranged such that positions thereof in the length direction (Y-axis direction) are shifted.

Note that in this example, the number of reproduction head portions 21 is two. Therefore, the first reproduction head portion 21a and the second reproduction head portion 21b are each configured to read a servo pattern in a plurality of servo bands corresponding to numbers that increment by two.

Meanwhile, for example, in the case where the number of reproduction head portions 21 is three, each reproduction head portion 21 may be configured to read a servo pattern in a plurality of servo bands corresponding to numbers that increment by three. That is, each reproduction head portion 21 only needs to be configured to be capable of reading a servo pattern recorded on a plurality of servo bands corresponding to numbers that increment by at least two, and the increment number changes depending on the number of reproduction head portions 21.

The first reproduction head portion 21a includes a first reproduction head 22a and a second reproduction head 22b. Further, the second reproduction head portion 21b includes a third reproduction head 22c and a fourth reproduction head 22d. Note that since the upstream side of the conveying direction of the magnetic tape 1 is the left side in FIG. 4 and FIG. 5, the arrangement of the respective reproduction heads 22 is in the order of the first reproduction head 22a, the second reproduction head 22b, the third reproduction head 22c, and the fourth reproduction head 22d from the upstream side of the conveying direction of the magnetic tape 1.

The four reproduction heads 22 each have a columnar shape that is long in the length direction (Y-axis direction), short in the width direction (X-axis direction), and short in the up-and-down direction (Z-axis direction). The length of each reproduction head 22 (Y-axis direction) is, for example, 19.3 mm or more. Note that the length of the reproduction head 22 may be appropriately changed. Typically, the length of the reproduction head 22 is such that even if the respective reproduction heads 22 are arranged to be shifted in the length direction, both ends of each reproduction head 22 in the length direction are located outside the width of the magnetic tape 1 with a sufficient margin and travelling of the magnetic tape 1 are not affected.

Here, the length direction (Y-axis direction) of the reproduction head 22 (reproduction head portion 21) corresponds to the width direction of the magnetic tape 1, the width direction (X-axis direction) of the reproduction head 22 corresponds to the length direction (conveying direction) of the magnetic tape 1, and the up-and-down direction of the reproduction head 22 corresponds to the thickness direction of the magnetic tape 1. Note that the direction of the magnetic tape 1 is a direction when the magnetic tape 1 passes through the position of the servo reproduction head 20.

In the lower part of the reproduction head 22 in the vicinity of the center in the width direction (X-axis direction), a facing surface 24 that faces the magnetic tape 1 is provided along the length direction (Y-axis direction). Further, in the lower part of the reproduction head 22 at a position sandwiching the facing surface 24 in the width direction (X-axis direction), two tapered surfaces 25 inclined in directions opposite to each other with respect to the horizontal surface are provided.

The first reproduction head 22a in the first reproduction head portion 21a is capable of reading the first servo pattern ("/") in the five servo bands (#0, #2, #4, #6, and #8) (first servo bands). Further, the second reproduction head 22b in the first reproduction head portion 21a is capable of reading the second servo pattern ("\") in the five servo bands (#0, #2, #4, #6, and #8) (first servo bands).

Further, the third reproduction head 22c in the second reproduction head portion 21b is capable of reading the first servo pattern ("/") in the four servo bands (#1, #3, #5, and #7) (second servo bands). Further, the fourth reproduction head 22d in the second reproduction head portion 21b is capable of reading the second servo pattern ("\") in the four servo bands (#1, #3, #5, and #7) (second servo bands).

The first reproduction head 22a includes five first servo elements 23a (gaps) capable of reading the first servo pattern ("/"). This first servo element 23a is inclined at the first azimuth angle with respect to the length direction (Y-axis direction) similarly to the first servo pattern.

Meanwhile, the second reproduction head 22b includes second servo elements 23b (gaps) capable of reading the second servo pattern ("\"). This second servo element 23b is formed so as to be inclined at the second azimuth angle with respect to the length direction (Y-axis direction) similarly to the second servo pattern.

Further, the third reproduction head 22c includes five first servo elements 23a (gaps) capable of reading the first servo pattern ("/"). Meanwhile, the fourth reproduction head 22d includes five second servo elements 23b (gaps) capable of reading the second servo pattern ("\").

Here, the first reproduction head 22a and the third reproduction head 22c have similar configurations. Further, the second reproduction head 22b and the fourth reproduction head 22d have similar configurations. However, the first reproduction head 22a and the second reproduction head 22b (the first reproduction head portion 21a), and the third reproduction head 22c and the fourth reproduction head 22d (the second reproduction head portion 21b) are arranged such that positions thereof in the length direction (Y-axis direction) are shifted. This shift amount is a distance corresponding to the pitch (Y-axis direction) between servo bands adjacent to each other.

The servo elements 23 are provided on the facing surface 24 of the respective reproduction heads 22. Further, the servo elements 23 are arranged at a pitch (second pitch) twice the pitch between servo bands (first pitch) in the length direction (Y-axis direction).

Note that in this example, since the number of reproduction head portions 21 is two, the pitch between the servo elements 23 is twice the pitch between servo bands. Meanwhile, for example, in the case where the number of reproduction head portions 21 is three, typically, the pitch between the servo elements 23 is three times the pitch between servo bands.

That is, the pitch between the servo elements 23 only needs to be an integral multiple and twice or more of the pitch between servo bands. Further, how many times the pitch between the servo elements 23 is the pitch between servo bands changes depending on the number of reproduction head portions 21.

In each reproduction head 22, five signal reading units 26 corresponding to the five servo elements 23 are provided in the upper part of the reproduction head 22 (on the side opposite to the side where the servo elements 23 are provided). The signal reading unit 26 is a mechanism for causing the corresponding servo element 23 to read a servo pattern and reading the signal. In the case where the servo reproduction head 20 is of an inductive type, this signal reading unit 26 includes a coil.

Note that although the case where the number of servo elements 23 is five has been described in this example, the number of servo elements 23 can be appropriately changed. Note that if the number of servo elements 23 is too large, the pitch between the servo elements 23 (Y-axis direction) becomes too narrow and there is a possibility that a servo pattern cannot be properly read. Therefore, the number of servo elements 23 is set in consideration of this point.

Further, although the third reproduction head 22c and the fourth reproduction head 22d in the second reproduction head portion 21b each include five servo elements 23 in this example, one servo element 23 provided on one end portion side of the five servo elements 23 is not used. Therefore, the one servo element 23 can also be omitted. Meanwhile, it is also possible to reduce costs by using heads having the same configuration in the first reproduction head portion 21a and the second reproduction head portion 21b as shown in the figure.

In this embodiment, the four reproduction heads 22 are attached to a position adjustment mechanism (not shown) to which these four reproduction heads 22 can be attached. This position adjustment mechanism is capable of integrally moving and individually moving the four reproduction heads 22 in the up-and-down direction (Z-axis direction), the length direction (Y-axis direction), and the width direction (X-axis direction). Note that the adjustment of the shift amount of the four reproduction heads 22 in the length direction (Y-axis direction) is performed by the movement in the Y-axis direction by this position adjustment mechanism.

<Examples and Comparative Examples>

Next, Examples and Comparative Examples will be described. FIG. 6 is a diagram showing Examples and Comparative Examples.

Figure 8:
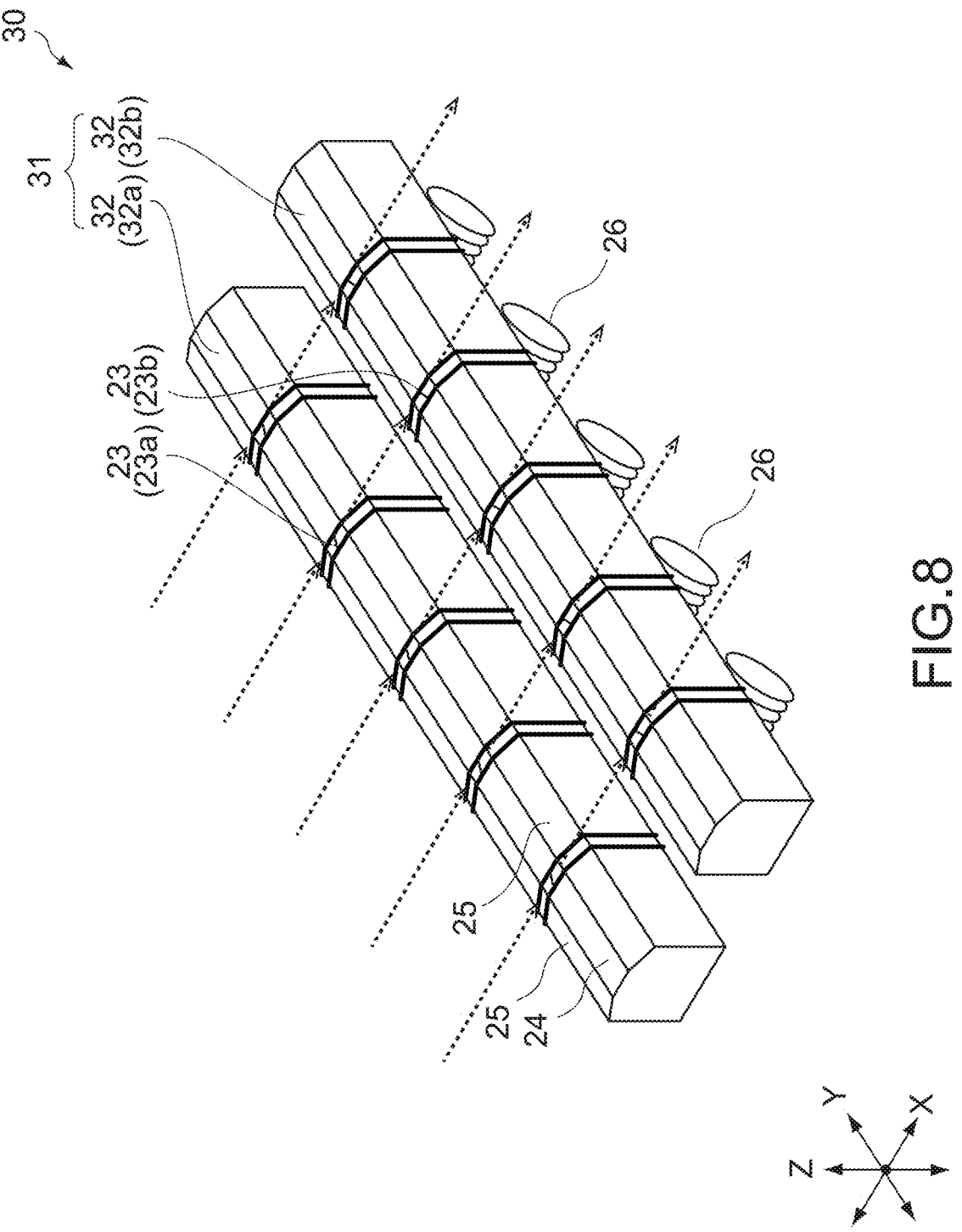
FIG. 8 is a perspective view of the servo reproduction head according to Comparative Example as viewed from the side facing the magnetic tape.
Figure 10:
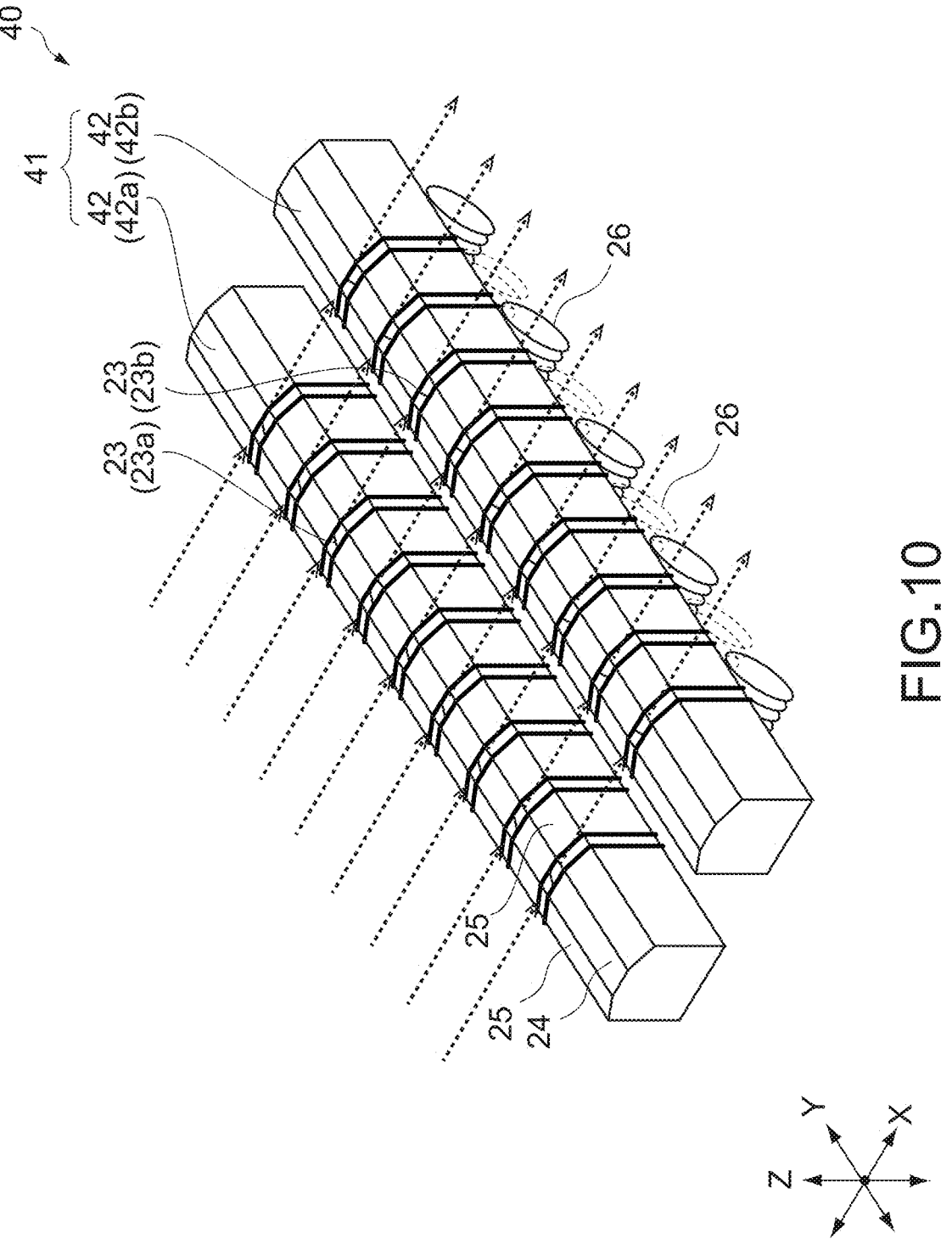
FIG. 10 is a perspective view of the servo reproduction head according to still another Comparative Example as viewed from the side facing the magnetic tape.

FIG. 7 is a plan view showing a relationship between a servo reproduction head 30 and a servo band according to Comparative Example as viewed from the side of the servo reproduction head 30 facing the magnetic tape 1. FIG. 8 is a perspective view of the servo reproduction head 30 according to Comparative Example as viewed from the side facing the magnetic tape. FIG. 9 is a plan view showing a relationship between a servo reproduction head 40 and a servo band according to still another Comparative Example as viewed from the side of the servo reproduction head 40 facing the magnetic tape 1. FIG. 10 is a perspective view of the servo reproduction head 40 according to still another Comparative Example as viewed from the side facing the magnetic tape.

Hereinafter, the example shown in FIG. 7 and FIG. 8 will be referred to as Comparative Example (1) and the example shown in FIG. 9 and FIG. 10 will be referred to as Comparative Example (2). Note that Comparative Example (1) corresponds to First Comparative Example in FIG. 6.

As shown in FIG. 7 and FIG. 8, the servo reproduction head 30 according to Comparative Example (1) is configured to read, from the magnetic tape 1 including a total of five servo bands, a servo pattern written to the five servo bands by one reproduction head portion 31 (two reproduction heads 32).

Further, as shown in FIG. 9 and FIG. 10, the servo reproduction head 40 according to Comparative Example (2) is configured to read, from the magnetic tape 1 including a total of nine servo bands, a servo pattern written to the nine servo bands by one reproduction head portion 41 (two reproduction heads 42).

As shown in FIG. 7 and FIG. 8, the reproduction head portion 31 in the servo reproduction head 30 according to Comparative Example (1) includes a first reproduction head 32*a* and a second reproduction head 32*b*. Further, as shown in FIG. 9 and FIG. 10, the reproduction head portion 41 in the servo reproduction head 40 according to the Comparative Example (2) includes a first reproduction head 42*a* and a second reproduction head 42*b*.

In Comparative Example (1), the number of servo elements 23 is five (number corresponding to the servo bands) in each reproduction head 32. Further, in Comparative Example (2), the number of servo elements 23 is nine (number corresponding to the number of servo bands) in each reproduction head 42.

Further, in Comparative Example (1) and Comparative Example (2), the pitch between the servo elements 23 in the length direction (Y-axis direction) of the reproduction head 22 is set to be equal to the pitch between servo bands.

The reproduction head 22 according to this embodiment and the reproduction heads 32 and 42 according to Comparative Examples have the same basic configuration. However, this embodiment is different from Comparative Examples in that two or more reproduction head portions 21 are used, the two or more reproduction head portions 21 share the responsibility of servo bands (servo bands that increment by at least two), the pitch between the servo elements 23 is an integral multiple and twice or more of the pitch between servo bands, and the like.

Here, in particular, in Comparative Example (2), since it is necessary to read the servo pattern in the nine servo bands by one reproduction head portion 41 (two reproduction heads 42), the pitch (Y-axis direction) between the servo elements 23 is narrow.

It is expected that the number of servo bands will increase in the future for higher-density recording of data. However, if the pitch (Y-axis direction) between the servo elements 23 is narrowed in accordance with an increase in the number of servo bands as in the Comparative Example (2), there is a problem that a servo pattern cannot be accurately read.

In particular, in the case of a servo reproduction head of an inductive type, a coil is used as the signal reading unit 26, but this coil has a relatively large size because it has a coil shape. Therefore, if the pitch (Y-axis direction) between the servo elements 23 is narrowed, there is also a problem that a servo pattern cannot be read because it becomes impossible to dispose a coil itself.

In this regard, in this embodiment, by preparing two or more reproduction head portions 21 (four or more reproduction heads 22) and disposing them such that positions of the respective reproduction head portions 21 in the Y-axis direction are shifted, the two or more reproduction head portions 21 share the responsibility of servo bands. As a result, even if the number of servo bands increases, it is possible to accurately read and reproduce servo patterns recorded on all servo bands without narrowing the intervals between the servo elements 23.

Next, Comparative Examples and Examples in FIG. 6 will be specifically described. In the description of FIG. 6, items will be described in order from the upper left item to the upper right item.

First, the item "interval (pitch)" in the servo band indicates the pitch between servo bands adjacent to each other in the width direction (Y-axis direction). In this example, four patterns of 2859 μm, 1280 μm, 980 μm, and 600 μm are prepared as pitches between servo bands.

In the case where the pitch between servo bands is 2859 μm, 1280 μm, 980 μm, and 600 μm, the number of servo bands is respectively 5, 10, 13, and 20.

In First Comparative Example, the pitch between servo bands is 2859 μm and the number of servo bands is 5. Further, in Second Comparative Example, Fifth Comparative Example, First Example, and Fifth Example to Eighth Example, the pitch between servo bands is 1280 μm and the number of servo bands is 10.

Further, in Third Comparative Example and Second Example, the pitch between servo bands is 980 μm and the number of servo bands is 13. Further, in Fourth Comparative Example and Third Example, the pitch between servo bands is 600 μm and the number of servo bands is 20.

Next, the item "width" in the servo band indicates the width of the servo band in the Y-axis direction. The width of the servo band is 70 μm in Fourth Example, and the width of the servo band is 93 μm in the other Comparative Examples and Examples. Note that the width (Y-axis direction) of the magnetic tape was 12.656 mm in common between Comparative Examples and Examples.

Next, the item "element type" in the servo reproduction head 20 indicates the type of servo element 23. The servo element 23 is of an MR type in Sixth Example, and the servo elements 23 is of an inductive type in the other Comparative Examples and Examples.

Next, the item "element interval (pitch)" in the servo reproduction head 20 means the pitch between the servo elements 23 in the length direction (Y-axis direction) of the reproduction head 22.

In First Comparative Example to Third Comparative Example, the pitch between the servo elements 23 is respectively 2859 μm, 1280 μm, and 980 μm and is equal to the pitch between servo bands. Meanwhile, in Fourth Comparative Example and Fifth Comparative Example, the pitch between the servo elements 23 is respectively 1200 μm and 2560 μm and is twice the pitch between servo bands.

Further, in First Example, Second Example, and Fourth Example to Eighth Example, the pitch between the servo elements 23 is respectively 2560 μm, 1960 μm, 2560 μm, 2560 μm, 2560 μm, 2560 μm, and 2560 μm and is twice the pitch between servo bands. Meanwhile, in Third Example, the pitch between the servo elements 23 is 1800 μm and is three times the pitch between servo bands (because a third reproduction head portion is further used).

Next, the term (head length) in the servo reproduction head 20 indicates the length of the reproduction head 22 in the length direction (Y-axis direction). In First Comparative Example to Third Comparative Example and Fifth Comparative Example, the length of reproduction head 22 is respectively 18.8 mm. Meanwhile, in Fourth Comparative Example and First Example to Eighth Example, the length of the reproduction head 22 is 19.3 mm.

Next, the item "gap central portion readability" in the servo reproduction head 20 indicates whether or not a servo pattern can be read in the central portion of the servo element 23.

Figure 11:
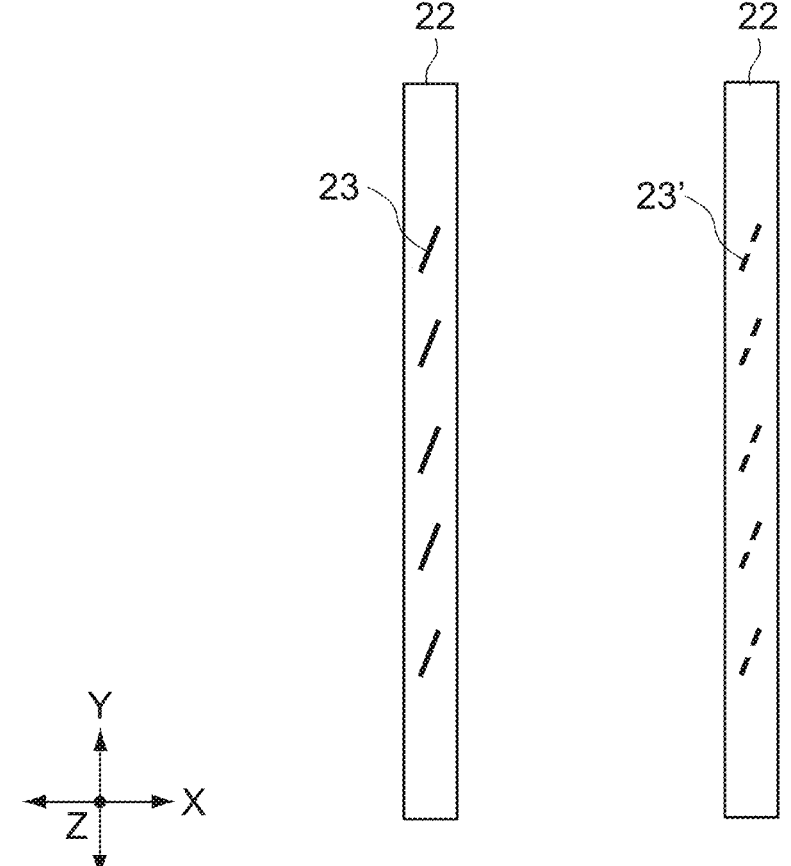
FIG. 11 is a diagram showing a form in which a servo pattern can be read and a form in which a servo pattern cannot be read in the central portions of servo elements.

FIG. 11 is a diagram showing a form in which a servo pattern can be read and a form in which a servo pattern cannot be read in the central portions of the servo elements 23. In FIG. 11, the left side shows a form in which a servo pattern can be read in the central portions of the servo elements 23, and the right side shows a form in which a servo pattern cannot be read in the central portions of servo elements 23'.

As shown on the right side of FIG. 11, this servo element 23' is missing at the central portion, and thus, a servo pattern cannot be read in the central portion of the servo element 23'.

This is due to the following reason. Failures of servo pattern writing tend to occur not near the central portion of the servo pattern but near both end portions of the servo pattern in the width direction (Y-axis direction) of the magnetic tape 1. Therefore, with the configuration in which the servo element 23' is missing the central portion, the reading sensitivity near both end portions of a servo pattern in the width direction (Y-axis direction) of the magnetic tape 1 is increased.

The form in which a servo pattern cannot be read in the central portions of the servo elements 23' is adopted in Fifth Example, and the form in which a servo pattern can be read in the central portions of the servo elements 23 is adopted in the other Comparative Examples and Examples.

Figure 12:
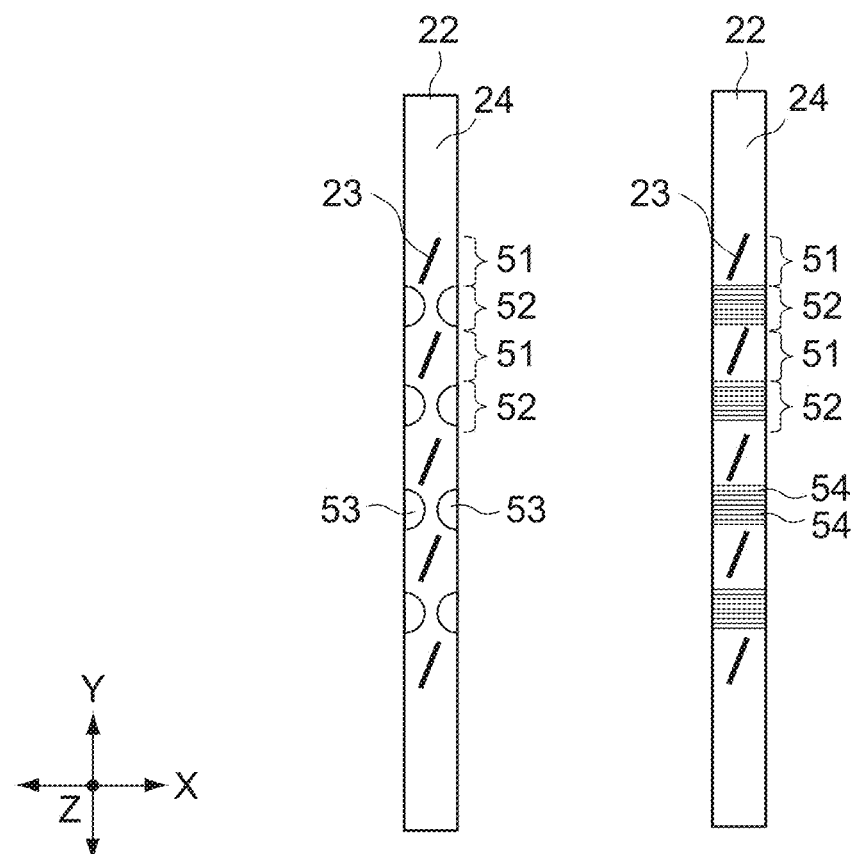
FIG. 12 is a diagram showing an example of surface low-friction processing on a facing surface.

Next, the term "surface low-friction processing" in the servo reproduction head 20 indicates whether or not processing for reducing surface friction has been performed on the facing surface 24 of the reproduction head 22. FIG. 12 is a diagram showing an example of surface low-friction processing on the facing surface 24.

With reference to the left side of FIG. 12, the facing surface 24 of the reproduction head 22 has first regions 51 corresponding to regions where the servo elements 23 are provided in the length direction (Y-axis direction) of the reproduction head 22 and second regions 52 corresponding to regions where the servo element 23 is not provided in the length direction (Y-axis direction).

In the second region 52, grooves 53 are provided at both ends of the reproduction head 22 in the width direction (X-axis). This makes the width (X-axis direction) of the second region 52 narrower than the width of the first region 51 on the facing surface 24. By narrowing the width of the second region 52 in this way, it is possible to reduce the frictional resistance between the facing surface 24 and the magnetic tape 1.

Although the shape of the groove 53 is semicircular in the example shown on the left side of FIG. 12, the shape of this groove may be rectangular or the like and is not particularly limited.

With reference to the right side of FIG. 12, the facing surface 24 of the reproduction head 22 has the first regions 51 corresponding to regions where the servo elements 23 are provided in the length direction (Y-axis direction) of the reproduction head 22 and the second regions 52 corresponding to regions where the servo element 23 is not provided in the length direction (Y-axis direction).

A plurality of grooves 54 that is long along the width direction (X-axis direction) of the reproduction head 22 and arranged in the length direction (Y-axis direction) of the reproduction head 22. By providing the plurality of grooves

54 in the second region 52 in this way, it is possible to reduce the frictional resistance between the facing surface 24 and the magnetic tape 1.

Note that the example shown on the left side of FIG. 12 and the example shown on the right side can be combined. That is, the width of the second region 52 may be made narrower than the width of the first region 51 and the plurality of grooves 54 as shown on the right side of FIG. 12 may be provided in the second region 52.

Returning to FIG. 6, the item "individual" in the servo reproduction head 20 means that the first servo element 23a ("/") and the second servo element 23b ("\") are provided in separate reproduction heads 22. This is common to all Comparative Examples and Examples.

Next, the term "number of reproduction head portions" in the servo reproduction head 20 indicates the number of reproduction head portions 21. The number of reproduction head portions 21 is 1 (the number of reproduction heads 22 is 2) in First Comparative Example to Third Comparative Example, and the number of reproduction head portions 21 is 2 (the number of reproduction heads 22 is 4) in Fourth Comparative Example, Fifth Comparative Example, First Example, Second Example, and Fourth Example to Eighth Example.

Further, in Third Example, the number of reproduction head portions 21 is 3 (the number of reproduction heads 22 is 6). That is, in Third Example, the servo reproduction head 20 includes the first reproduction head portion 21, the second reproduction head portion 21b, and a third reproduction head portion. The reproduction head portions 21 are arranged such that positions thereof in the length direction (Y-axis direction) are shifted. Further, the reproduction head portions 21 are configured to read a servo pattern in a plurality of servo bands corresponding to numbers that increment by three and do not overlap with each other (first numbers, second numbers, and third numbers).

Next, the "arrangement order" in the servo reproduction head 20 indicates the order of arrangement of the reproduction head 22 including the first servo element 23a ("/") and the reproduction head 22 including the second servo element 23b ("\"). Note that in FIG. 6, the left side is the upstream side of the conveying direction of the magnetic tape 1.

In all Comparative Examples and Examples except for Seventh Example, the reproduction heads 22 are arranged in order of the reproduction head 22 including the first servo element 23a ("/") and the reproduction head 22 including the second servo element 23b ("\") from the upstream side of the conveying direction of the magnetic tape 1. Note that in FIG. 6, "/" and "\" adjacent to each other indicate two reproduction heads 22 included in one reproduction head portion 21.

Figure 13:
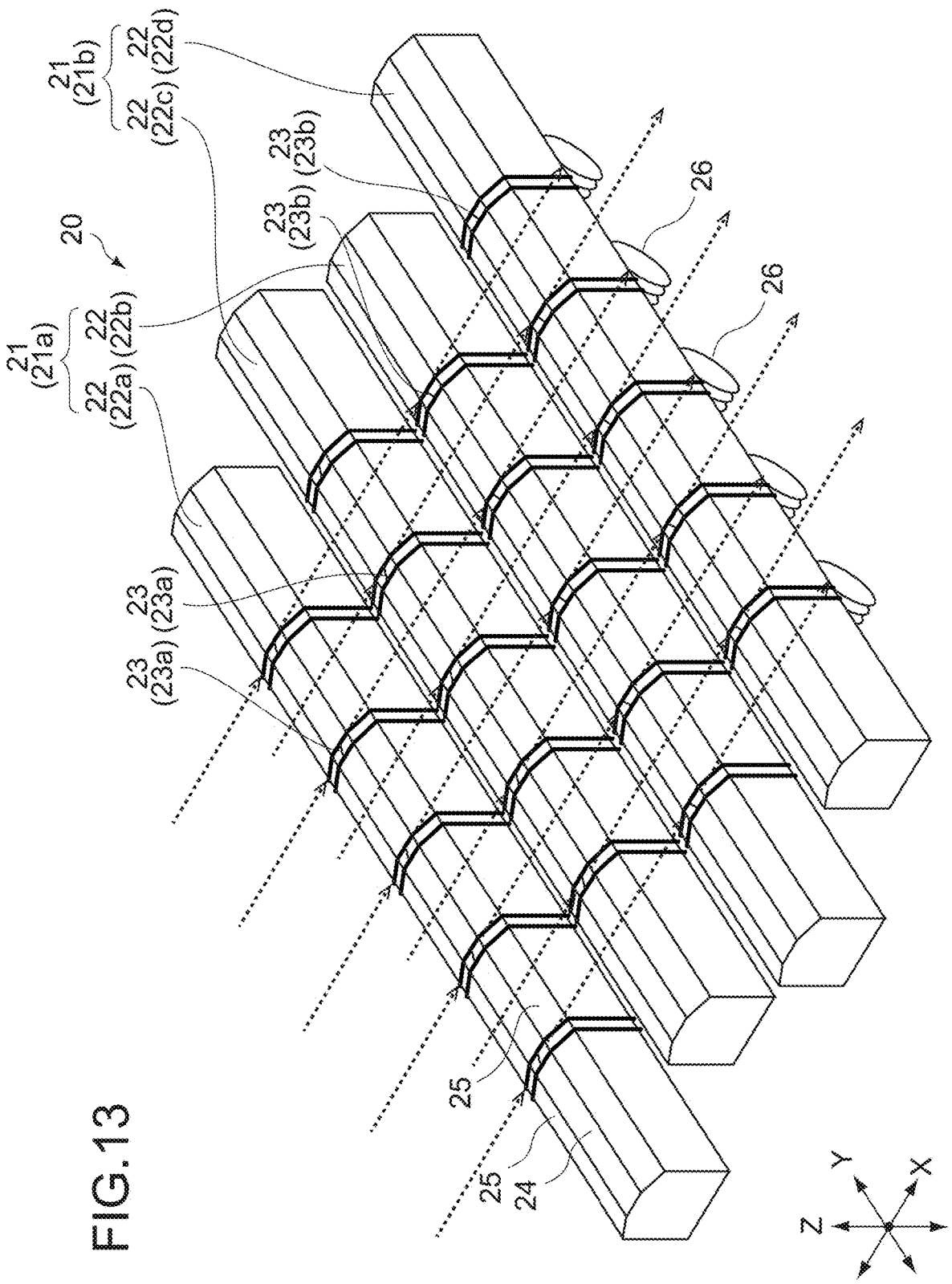
FIG. 13 is a perspective view of a servo reproduction head according to Seventh Example as viewed from the side facing the magnetic tape.

FIG. 13 is a perspective view of the servo reproduction head 20 according to Seventh Example as viewed from the side facing the magnetic tape. As shown in FIG. 13, in Seventh Example, the reproduction heads 22 are arranged in order of the first reproduction head 22a ("/") of the first reproduction head portion 21a, the third reproduction head 22c ("/") of the second reproduction head portion 21b, the second reproduction head 22b ("\") of the first reproduction head portion 21a, and the fourth reproduction head 22d ("\") of the second reproduction head portion 21b from the upstream side of the conveying direction of the magnetic tape 1 (left side of FIG. 13).

Note that the order of arrangement of the four or more reproduction heads 22 in this embodiment may be appropriately changed.

Here, in the case where the number of reproduction head portions 21 is 2 and the number of reproduction heads 22 is 4, there are 4!=24 patters of the order of arrangement but any arrangement may be used. Similarly, in the case where the number of reproduction head portions 21 is 3 or more and the number of reproduction head portions 21 is 6 or more, any arrangement may be used.

Note that although there are 24 patterns of arrangement as described above in the case where the number of reproduction head portions 21 is 2, there are 4 patterns in which the two reproduction heads 22 in the first reproduction head portion 21a are adjacent to each other and the two reproduction heads 22 in the second reproduction head portion 21b are adjacent to each other, of the 24 patterns.

That is, when the number in parentheses is the number for the reproduction head portion 21, the 4 patterns are the pattern of (1) "/" (1) "\" (2) "/" (2) "\", the pattern of (2) "/" (2) "\" (1) "/" (1) "\", the pattern of (1) "\" (1) "/" (2) "\" (2) "/", and the pattern of (2) "\" (2) "/" (1) "\" (1) "/". The other 20 patterns are patterns in which the two reproduction heads 22 in at least one reproduction head portion 21 of the first reproduction head portion 21a or the second reproduction head portion 21b are not adjacent to each other.

Returning to FIG. 6, the term "position adjustment mechanism" in the servo reproduction head 20 indicates the presence or absence of a position adjustment mechanism to which a plurality of reproduction heads 22 can be attached, which is capable of adjusting the positions of the plurality of reproduction heads 22. In this example, in all Comparative Examples and Examples, the position adjustment mechanism is provided.

Next, the term "supportability for simultaneous reading of all servo bands" in the properties indicates whether or not servo patterns of all servo bands can be read by the servo reproduction head 20 when the magnetic tape 1 passes through the position of the servo reproduction head 20.

First, attention will be paid to First Comparative Example, Second Comparative Example, and Third Comparative Example. As shown in the term "supportability for simultaneous reading of all servo bands" in FIG. 6, servo patterns in all servo bands can be read in First Comparative Example (see also FIG. 7 and FIG. 8), but servo patterns in all servo bands cannot be read in Second Comparative Example and Third Comparative Example (see also FIG. 9 and FIG. 10).

This is due to the following reason. First, as shown in also FIG. 7 to FIG. 10, servo patterns in all servo bands are read by one reproduction head portion 31/41 (two reproduction heads 32/42) in First Comparative Example, Second Comparative Example, and Third Comparative Example. For this reason, the pitch (Y-axis direction) between the servo elements 23 in the reproduction head portion 31/41 is equal to the pitch between servo bands in the magnetic tape 1.

In First Comparative Example, since the number of servo bands in the magnetic tape 1 is as small as five, the pitch between the servo elements 23 is relatively wide (2859 μm), and thus, servo patterns in all servo bands can be read.

On the other hand, in Second Comparative Example and Third Comparative Example, since the number of servo bands in the magnetic tape 1 is as larger as 10 and 13, respectively, the pitch between the servo elements 23 is narrow (1280 μm, 980 μm), and thus, servo patterns in all servo bands cannot be read.

In particular, in the case of the servo reproduction head 20 of an inductive type, a coil is used as the signal reading unit 26, but this coil has a relatively large size because it has a coil shape. Therefore, if the pitch (Y-axis direction) between the servo elements 23 is narrowed, it becomes impossible to dispose a coil itself and a servo pattern cannot be read.

Next, attention will be paid to First Example and Second Example. As shown in the term "supportability for simultaneous reading of all servo bands" in FIG. 6, servo patterns in all servo bands can be read in First Example Second Example.

In First Example, the two reproduction head portions 21 (four reproduction heads 22) share the reading of servo patterns in all servo bands, but the other configurations of the magnetic tape 1 and the like are the same as those in Second Comparative Example. Further, in Second Example, the two reproduction head portions 21 (four reproduction heads) share the reading of servo patterns in all servo bands, but the other configurations of the magnetic tape 1 and the like are the same as those in Third Comparative Example.

In First Example and Second Example, since the two reproduction head portions 21 (four reproduction heads 22) share the reading of all servo bands, it is possible to widen the pitch between the servo elements 23 (2560 μm, 1960 μm) in the length direction (Y-axis direction). Therefore, for example, even in the case where the number of servo bands increases and the pitch between servo bands is narrowed for higher-density recording of data, servo patterns in all servo bands can be accurately read and reproduced. This is the same in Third Example to Eighth Example.

Next, attention will be paid to Fourth Comparative Example and Third Example. As shown in the term "supportability for simultaneous reading of all servo bands" in FIG. 6, servo patterns in all servo bands cannot be read in Fourth Comparative Example, but servo patterns in all servo bands can be read in Third Example.

In Fourth Comparative Example, the two reproduction head portions 21 share the reading of servo patterns in all servo bands, similarly to this embodiment. On the other hand, in Fourth Comparative Example, since the pitch (Y-axis direction) between servo bands in the magnetic tape 1 is as quite narrow as 600 μm, the pitch between the servo elements 23 is narrow even if the pitch between the servo elements 23 is twice that, i.e., 1200 μm. For this reason, in Fourth Comparative Example, servo patterns in all servo bands cannot be read.

On the other hand, in Third Example, although the configuration and the like of the magnetic tape 1 are the same as those in Fourth Comparative Example, the number of reproduction head portions 21 is 3 (the number of reproduction heads 22 is 6) and the pitch (Y-axis direction) between the servo elements 23 is three times the pitch between servo bands (600 μm), i.e., 1800 μm. For this reason, in Third Example, it is possible to provide a sufficient distance as the pitch between the servo elements 23, and therefore, it is possible to accurately read servo patterns in all servo bands.

Next, attention will be paid to First Example and Fourth Example. In First Example, the width (Y-axis direction) of the servo band in the magnetic tape 1 is 93 μm. On the other hand, in Fourth Example, the width (Y-axis direction) of the servo band in the magnetic tape 1 is narrower than that in First Example, i.e., 70 μm. The other configurations are common to First Example and Fourth Example.

As shown in the term "supportability for simultaneous reading of all servo bands" in FIG. 6, servo patterns in all servo bands can be appropriately read in also First Example and Fourth Example. Therefore, in this embodiment, the width of the servo band is typically 93 μm or less, 70 μm or less, or the like.

Next, attention will be paid to First Example and Fifth Example. In First Example, a form in which a servo pattern can be read in the central portions of the servo elements 23

(see the left side of FIG. 11) is adopted. On the other hand, in Fifth Example, a form in which a servo pattern cannot be read in the central portions of the servo elements 23' (see the right side of FIG. 11) is adopted. The other configurations are common to First Example and Fifth Example.

As shown in the term "supportability for simultaneous reading of all servo bands" in FIG. 6, servo patterns in all servo bands can be appropriately read in also First Example and Fifth Example. Therefore, in this embodiment, a servo pattern may be readable in the central portions of the servo elements 23 and a servo pattern may be unreadable in the central portions of the servo elements 23'.

Next, attention will be paid to First Example and Sixth Example. The servo element 23 is of an inductive type in First Example, while the servo element 23 is of an MR type in Fifth Example. The other configurations are common to First Example and Sixth Example.

As shown in the term "supportability for simultaneous reading of all servo bands" in FIG. 6, servo patterns in all servo bands can be appropriately read in also First Example and Sixth Example.

Therefore, in this embodiment, the type of the servo element 23 may be an inductive type, an MR type, a GMR type, a TMR type, or the like. However, in the case where the servo element 23 is of an inductive type, there is a problem of the arrangement based on the size of the signal reading unit 26 (coil) as described above. Therefore, it is particularly effective to adopt the present technology in the case where the servo element 23 is of an inductive type.

Next, attention will be paid to First Example and Seventh Example. In First Example, the order of arrangement of the reproduction head 22 including the first servo element 23a ("/") and the reproduction head 22 including the second servo element 23b ("\") is the order of "/\/\". That is, First Example adopts a form in which the two reproduction heads 22 in the first reproduction head portion 21a are adjacent to each other in the width direction (X-axis direction) and the two reproduction heads 22 in the second reproduction head portion 21b are adjacent to each other in the width direction.

In Seventh Example, the order of arrangement of the reproduction head 22 including the first servo element 23a ("/") and the reproduction head 22 including the second servo element 23b ("\") is the order of "//\\" (see FIG. 13). That is, Seventh Embodiment adopts a form in which the two reproduction heads 22 in the reproduction head portion 21 of at least one of the first reproduction head portion 21a or the second reproduction head portion 21b are not adjacent to each other in the width direction (X-axis direction). Note that the other configurations are common to First Example and Seventh Example.

As shown in the term "supportability for simultaneous reading of all servo bands" in FIG. 6, servo patterns in all servo bands can be appropriately read also in First Example and Seventh Example. Therefore, in this embodiment, the above adjacent form or the non-adjacent form may be adopted.

Next, the term "reproduction head friction increase" in the properties means the degree of frictional resistance between the servo reproduction head 20 (the facing surface 24) and the magnetic tape 1. In First Comparative Example to Third Comparative Example, since the number of reproduction head portions 31/41 is one (the number of reproduction heads 32/42 is two), the frictional resistance between the servo reproduction head 30/40 and the magnetic tape 1 is normal.

On the other hand, in Fourth Comparative Example, Fifth Comparative Example, First Example, Second Example, and Fourth Example to Seventh Example, since the number of reproduction head portions 21 is two (the number of reproduction heads 22 is four), the frictional resistance between the servo reproduction head 20 and the magnetic tape 1 is high. Further, in Third Example, since the number of reproduction head portions 21 is three (the number of reproduction heads 22 is 6), the frictional resistance between the servo reproduction head 20 and the magnetic tape 1 is even higher.

When the frictional resistance between the servo reproduction head 20 and the magnetic tape 1 is high, there is a possibility that the reading accuracy of a servo pattern by the servo reproduction head 20 is adversely affected and the writing accuracy of a servo pattern by the servo write head 15 is adversely affected.

Here, attention will be paid to First Example and Eighth Example. The facing surface 24 of each reproduction head 22 has not been subjected to low-friction processing in First Example, while the facing surface 24 of each reproduction head 22 has been subjected to low-friction processing (see FIG. 12) in Eighth Example. The other configurations are common to First Example and Eighth Example.

In Eighth Example, since low-friction processing as shown in FIG. 12, for example, has been performed, the frictional resistance between the servo reproduction head 20 and the magnetic tape 1 is normal although the number of reproduction head portions 21 is two (the number of reproduction heads 22 is four).

That is, in the present technology, since the number of reproduction head portions 21 is two or more (the number of reproduction heads 22 is four or more) and the number of reproduction head portions 21 is large, the frictional resistance between the servo reproduction head 20 and the magnetic tape 1 tends to be high. Meanwhile, by causing the facing surface 24 of each reproduction head 22 to be subjected to processing as shown in FIG. 12, for example, it is possible to suppress the frictional resistance between the servo reproduction head 20 and the magnetic tape 1 even if the number of reproduction head portions 21 is large.

Next, the term "magnetic tape travelling stability" in the properties means the stability of travelling of the magnetic tape 1 when the magnetic tape 1 passes through the position of the servo reproduction head 20. Although the travelling of the magnetic tape 1 is unstable in Fifth Comparative Example, the travelling of the magnetic tape 1 is stable in the other Comparative Examples and Examples.

Here, attention will be paid to First Example and Fifth Comparative Example. The length (Y-axis direction) of the reproduction head 22 is 19.3 mm in First Example, while the length of the reproduction head 22 is shorter than that in First Example, i.e., 18.3 mm, in Fifth Comparative Example. The other configurations are common to First Example and Fifth Comparative Example.

In Fifth Comparative Example, the positions of the two reproduction head portions 21 are shifted in the length direction (Y-axis direction) of the reproduction head 22, similarly to this embodiment. Therefore, when the length of the reproduction head 22 is short (18.3 mm), the reproduction head 22 will not be able to properly come into contact with the entire width (12.656 mm) of the magnetic tape 1. For this reason, in Fifth Comparative Example, the travelling of the magnetic tape 1 is unstable.

Therefore, in this embodiment, the length (Y-axis direction) of the reproduction head portion 21 is typically 19.3 mm or more.

<Effects, Etc.>

As described above, the servo reproduction head 20 according to this embodiment includes the first reproduction head portion 21a that reads a servo pattern recorded on a plurality of first servo bands (e.g., #0, #2, #4, #6, and #8), which are some of all servo bands (e.g., #0 to #8) in the magnetic tape 1, and the second reproduction head portion 21b that reads a servo pattern recorded on a plurality of second servo bands (e.g., #1, #3, #5, and #7), which are the others thereof.

As a result, the reading of a servo pattern can be shared by two or more reproduction head portions 21 for each servo band group. Therefore, for example, it is possible to accurately read servo patterns in all servo bands even if the number of servo bands increases and the pitch between servo bands is narrowed for higher-density recording of data.

Further, in this embodiment, the first reproduction head portion 21a is configured to read a servo pattern recorded on a plurality of first servo bands (e.g., #0, #2, #4, #6, and #8) corresponding to first numbers (e.g., #0, #2, #4, #6, and #8) that increment by at least two. Further, the second reproduction head portion 21b is configured to read a servo pattern recorded on a plurality of second servo bands (e.g., #1, #3, #5, and #7) corresponding to second numbers (e.g., #1, #3, #5, and #7) that increment by at least two and are different from the first numbers.

As a result, servo patterns in all servo bands can be read more accurately even if the pitch between servo bands is narrowed.

Further, in this embodiment, the first reproduction head portion 21a and the second reproduction head portion 21b each include the plurality of servo elements 23 for reading a servo pattern. Then, the plurality of servo elements 23 is arranged at the pitch that is an integral multiple and twice or more of the pitch between servo bands in the length direction (Y-axis direction) of the reproduction head portion 21.

As a result, since the pitch between the servo elements 23 can be widened even if the pitch between servo bands is narrowed, servo patterns in all servo bands can be read more accurately read.

Further, in this embodiment, the first reproduction head portion 21a and the second reproduction head portion 21b are arranged such that the positions of the reproduction head portions 21 are shifted in the length direction (Y-axis direction).

As a result, for example, the reproduction heads 22 having the same configuration can be used as the reproduction heads 22 to be used in the first reproduction head portion 21a and the second reproduction head portion 21b.

Here, the servo recording/reproduction apparatus 100 according to this embodiment is particularly effective when used as an apparatus that reads a servo pattern of the magnetic tape 1 having a large number of servo bands and a narrow pitch between servo bands.

Therefore, for example, the servo recording/reproduction apparatus 100 according to this embodiment is used as an apparatus that reads a servo pattern in the magnetic tape 1 including nine or more servo bands. Further, the servo recording/reproduction apparatus 100 according to this embodiment is used as, for example, an apparatus that reads a servo pattern in the magnetic tape 1 having the pitch (Y-axis direction) between servo bands of 1280 μm or less.

However, this does not means that the servo recording/reproduction apparatus 100 according to this embodiment cannot be used as an apparatus that reads a servo pattern in the magnetic tape 1 including eight or less servo bands or the magnetic tape 1 having the pitch between servo bands exceeding 1280 μm. That is, the servo recording/reproduction apparatus 100 according to this embodiment may be used as an apparatus that reads a servo pattern in the magnetic tape 1 including eight or less servo bands or the magnetic tape 1 having the pitch between servo bands exceeding 1280 μm.

Further, in the servo recording/reproduction apparatus 100 according to this embodiment, the servo reproduction head 20 may be of an inductive type. In this case, the above problem of arrangement based on the size of the signal reading unit 26 (coil) is solved, which is particularly advantageous. However, the servo reproduction head 20 may be of another type such as an MR type.

Further, in this embodiment, in the case where the facing surface 24 of each reproduction head 22 is subjected to low-friction processing (see FIG. 12), it is possible to suppress an increase in the friction of the magnetic tape 1 in the servo reproduction head 20. As a result, it is possible to prevent the reading accuracy of a servo pattern by the servo reproduction head 20 from being adversely affected and the writing accuracy of a servo pattern by the servo write head 15 from being adversely affected.

In particular, in this embodiment, since the number of reproduction head portions 21 is two or more (the number of reproduction heads 22 is four or more) and the number of reproduction head portions 21 is large, the frictional resistance between the servo reproduction head 20 and the magnetic tape 1 tends to be large. Therefore, reducing the frictional resistance between the servo reproduction head 20 and the magnetic tape 1 by the low-friction processing as described above is particularly effective.

Further, in this embodiment, in the case where the length (Y-axis direction) of the reproduction head portion 21 (reproduction head 22) is 19.3 mm or more, it is possible to improve travelling stability of the magnetic tape 1. Note that the length (Y-axis direction) of the reproduction head portion 21 (reproduction head 22) may be appropriately changed in accordance with the width of the magnetic tape 1 (e.g., 12.656 mm) (the wider the width of the magnetic tape 1, the longer the length of the reproduction head portion 21 needs to be).

<<Various Modified Examples>>

The present technology may also take the following configurations.

(1) A servo reproduction apparatus, including:
  a servo reproduction head that includes
    a first reproduction head portion that reads a servo pattern recorded on a plurality of first servo bands, which are some of a plurality of servo bands in a magnetic tape including the plurality of servo bands, and
    a second reproduction head portion that reads a servo pattern recorded on a plurality of second servo bands, which are others of the plurality of servo bands.

(2) The servo reproduction apparatus according to (1) above, in which
  when the plurality of servo bands is sequentially numbered in a width direction of the magnetic tape,
  the first reproduction head portion reads a servo pattern recorded on the plurality of first servo bands corresponding to first numbers that increment by at least two.

(3) The servo reproduction apparatus according to (2) above, in which the second reproduction head portion reads a servo pattern recorded on the plurality of second servo bands corresponding to second numbers that increment by at least two and are different from the first numbers.

(4) The servo reproduction apparatus according to any one of (1) to (3) above, in which the plurality of servo bands is arranged at a first pitch in a width direction of the magnetic tape, the first reproduction head portion and the second reproduction head portion have a length direction in the width direction of the magnetic tape, and the first reproduction head portion and the second reproduction head portion are servo elements that read the servo pattern, and each include a plurality of servo elements arranged at a second pitch that is an integral multiple and twice or more of the first pitch in the length direction of the corresponding reproduction head portion.

(5) The servo reproduction apparatus according to any one of (1) to (4) above, in which the first reproduction head portion and the second reproduction head portion have a length direction in a width direction of the magnetic tape, and the first reproduction head portion and the second reproduction head portion are arranged such that positions of the respective reproduction head portions in the length direction are shifted.

(6) The servo reproduction apparatus according to (4) above, in which the first reproduction head portion and the second reproduction head portion have a width direction in a length direction of the magnetic tape, the first reproduction head portion and the second reproduction head portion each have a facing surface that includes a first region and a second region and faces the magnetic tape, the first region corresponding to a position where the servo element is provided in the length direction of the corresponding reproduction head portion, the second region corresponding to a position where the servo element is not provided in the length direction of the corresponding reproduction head portion, and a width of the second region in the width direction of the corresponding reproduction head portion is narrower than a width of the first region on the facing surface, or a plurality of grooves that is along the width direction of the corresponding reproduction head portion and arranged in the length direction of the corresponding reproduction head portion is formed in the second region on the facing surface.

(7) The servo reproduction apparatus according to any one of (1) to (6) above, in which the plurality of servo bands is arranged at a first pitch in a width direction of the magnetic tape, and the first pitch is 1280 μm or less.

(8) The servo reproduction apparatus according to any one of (1) to (7) above, in which the magnetic tape has a width of 12.656 mm or less in a width direction of the magnetic tape.

(9) The servo reproduction apparatus according to (8) above, in which the magnetic tape includes 9 or more servo bands.

(10) The servo reproduction apparatus according to any one of (1) to (9) above, in which each of the plurality of servo bands has a width of 93 μm or less in a width direction of the magnetic tape.

(11) The servo reproduction apparatus according to any one of (1) to (10) above, in which the first reproduction head portion and the second reproduction head portion have a length direction in a width direction of the magnetic tape, and each of the first reproduction head portion and the second reproduction head portion has a length of 19.3 mm or more in the length direction of the corresponding reproduction head portion.

(12) The servo reproduction apparatus according to any one of (1) to (11) above, in which the first reproduction head portion and the second reproduction head portion are each of an inductive type.

(13) The servo reproduction apparatus according to any one of (1) to (12) above, in which the servo pattern includes a first servo pattern inclined at a first azimuth angle with respect to a width direction of the magnetic tape and a second servo pattern inclined at a second azimuth angle opposite to the first azimuth angle with respect to the width direction of the magnetic tape.

(14) The servo reproduction apparatus according to (13) above, in which the first reproduction head portion and the second reproduction head portion read the servo pattern at both end portions of the first servo pattern and the second servo pattern excluding a central portion.

(15) The servo reproduction apparatus according to (13) or (14) above, in which the first reproduction head portion includes the first reproduction head that reads the first servo pattern and a second reproduction head that reads the second servo pattern in the plurality of first servo bands, and the second reproduction head portion includes the third reproduction head that reads the first servo pattern and a fourth reproduction head that reads the second servo pattern in the plurality of second servo bands.

(16) The servo reproduction apparatus according to (15) above, in which the first reproduction head portion and the second reproduction head portion have a width direction in a length direction of the magnetic tape, the two reproduction heads of the first reproduction head portion are adjacent to each other in the width direction of the corresponding reproduction head portion, and the two reproduction heads of the second reproduction head portion are adjacent to each other in the width direction of the corresponding reproduction head portion.

(17) The servo reproduction apparatus according to (15) above, in which the first reproduction head portion and the second reproduction head portion have a width direction in a length direction of the magnetic tape, and the two reproduction heads of at least one of the first reproduction head portion or the second reproduction head portion are not adjacent to each other in the width direction of the corresponding reproduction head portion.

(18) A servo reproduction head, including:

a first reproduction head portion that reads a servo pattern recorded on a plurality of first servo bands, which are some of a plurality of servo bands in a magnetic tape including the plurality of servo bands; and a second reproduction head portion that reads a servo pattern recorded on a plurality of second servo bands, which are others of the plurality of servo bands.

(19) A reproduction head, including:

a plurality of servo elements each reading a servo pattern recorded on a plurality of servo bands in a magnetic tape including the plurality of servo bands, the reproduction head having a length direction in a width direction of the magnetic tape and a width direction in a length direction of the magnetic tape, the reproduction head having a facing surface that includes a first region and a second region and faces the magnetic tape, the first region corresponding to a position where the servo element is provided in the length direction of the reproduction head, the second region corresponding to a position where the servo element is not provided in the length direction of the reproduction head, and a width of the second region in the width direction of the reproduction head being narrower than a width of the first region in the first direction on the facing surface, or a plurality of grooves that is along the width direction of the reproduction head and arranged in the length direction of the reproduction head being formed in the second region on the facing surface.

(20) A method of producing a magnetic tape, including:

reading, by a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, the servo pattern; and checking, on a basis of information regarding the read servo pattern, whether or not the servo pattern has been accurately written.

REFERENCE SIGNS LIST

1 magnetic tape
20 servo reproduction head
21 reproduction head portion
22 reproduction head
23, 23' servo element
24 facing surface
26 signal reading unit
100 servo recording/reproduction apparatus

The invention claimed is:

1. A servo reproduction apparatus, comprising:

a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, wherein when the plurality of servo bands is sequentially numbered in a width direction of the magnetic tape, the first reproduction head portion reads a servo pattern recorded on the plurality of first servo bands corresponding to first numbers that increment by at least two.

2. The servo reproduction apparatus according to claim 1, wherein the second reproduction head portion reads a servo pattern recorded on the plurality of second servo bands corresponding to second numbers that increment by at least two and are different from the first numbers.

3. The servo reproduction apparatus according to claim 1, wherein the plurality of servo bands is arranged at a first pitch in a width direction of the magnetic tape, the first reproduction head portion and the second reproduction head portion have a length direction in the width direction of the magnetic tape, and the first reproduction head portion and the second reproduction head portion are servo elements that read the servo pattern, and each include a plurality of servo elements arranged at a second pitch that is an integral multiple and twice or more of the first pitch in the length direction of the corresponding reproduction head portion.

4. The servo reproduction apparatus according to claim 3, wherein the first reproduction head portion and the second reproduction head portion have a width direction in a length direction of the magnetic tape, the first reproduction head portion and the second reproduction head portion each have a facing surface that includes a first region and a second region and faces the magnetic tape, the first region corresponding to a position where the servo element is provided in the length direction of the corresponding reproduction head portion, the second region corresponding to a position where the servo element is not provided in the length direction of the corresponding reproduction head portion, and a width of the second region in the width direction of the corresponding reproduction head portion is narrower than a width of the first region on the facing surface, or a plurality of grooves that is along the width direction of the corresponding reproduction head portion and arranged in the length direction of the corresponding reproduction head portion is formed in the second region on the facing surface.

5. The servo reproduction apparatus according to claim 1, wherein the first reproduction head portion and the second reproduction head portion have a length direction in a width direction of the magnetic tape, and the first reproduction head portion and the second reproduction head portion are arranged such that positions of the respective reproduction head portions in the length direction are shifted.

6. The servo reproduction apparatus according to claim 1, wherein the plurality of servo bands is arranged at a first pitch in a width direction of the magnetic tape, and the first pitch is 1280 μm or less.

7. The servo reproduction apparatus according to claim 1, wherein the magnetic tape has a width of 12.656 mm or less in a width direction of the magnetic tape.

8. The servo reproduction apparatus according to claim 7, wherein the magnetic tape includes 9 or more servo bands.

9. The servo reproduction apparatus according to claim 1, wherein each of the plurality of servo bands has a width of 93 μm or less in a width direction of the magnetic tape.

10. The servo reproduction apparatus according to claim 1, wherein the first reproduction head portion and the second reproduction head portion have a length direction in a width direction of the magnetic tape, and each of the first reproduction head portion and the second reproduction head portion has a length of 19.3 mm or more in the length direction of the corresponding reproduction head portion.

11. The servo reproduction apparatus according to claim 1, wherein the first reproduction head portion and the second reproduction head portion are each of an inductive type.

12. The servo reproduction apparatus according to claim 1, wherein the servo pattern includes a first servo pattern inclined at a first azimuth angle with respect to a width direction of the magnetic tape and a second servo pattern inclined at a second azimuth angle opposite to the first azimuth angle with respect to the width direction of the magnetic tape.

13. The servo reproduction apparatus according to claim 12, wherein the first reproduction head portion and the second reproduction head portion read the servo pattern at both end portions of the first servo pattern and the second servo pattern excluding a central portion.

14. The servo reproduction apparatus according to claim 12, wherein the first reproduction head portion includes a first reproduction head that reads the first servo pattern and a second reproduction head that reads the second servo pattern in the plurality of first servo bands, and the second reproduction head portion includes a third reproduction head that reads the first servo pattern and a fourth reproduction head that reads the second servo pattern in the plurality of second servo bands.

15. The servo reproduction apparatus according to claim 14, wherein the first reproduction head portion and the second reproduction head portion have a width direction in a length direction of the magnetic tape, the two reproduction heads of the first reproduction head portion are adjacent to each other in the width direction of the corresponding reproduction head portion, and the two reproduction heads of the second reproduction head portion are adjacent to each other in the width direction of the corresponding reproduction head portion.

16. The servo reproduction apparatus according to claim 14, wherein the first reproduction head portion and the second reproduction head portion have a width direction in a length direction of the magnetic tape, and the two reproduction heads of at least one of the first reproduction head portion or the second reproduction head portion are not adjacent to each other in the width direction of the corresponding reproduction head portion.

17. A servo reproduction apparatus, comprising:

a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, wherein the plurality of servo bands is arranged at a first pitch in a width direction of the magnetic tape, the first reproduction head portion and the second reproduction head portion have a length direction in the width direction of the magnetic tape, and the first reproduction head portion and the second reproduction head portion are servo elements that read the servo pattern, and each include a plurality of servo elements arranged at a second pitch that is an integral multiple and twice or more of the first pitch in the length direction of the corresponding reproduction head portion.

18. A servo reproduction apparatus, comprising:

a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, wherein the first reproduction head portion and the second reproduction head portion have a length direction in a width direction of the magnetic tape, and the first reproduction head portion and the second reproduction head portion are arranged such that positions of the respective reproduction head portions in the length direction are shifted.

19. A servo reproduction apparatus, comprising:

a servo reproduction head that includes a first reproduction head portion that reads a servo pattern recorded on a plurality of first servo bands, which are some of a plurality of servo bands in a magnetic tape including the plurality of servo bands, and a second reproduction head portion that reads a servo pattern recorded on a plurality of second servo bands, which are others of the plurality of servo bands, wherein the servo pattern includes a first servo pattern inclined at a first azimuth angle with respect to a width direction of the magnetic tape and a second servo pattern inclined at a second azimuth angle opposite to the first azimuth angle with respect to the width direction of the magnetic tape, the first reproduction head portion includes a first reproduction head that reads the first servo pattern and a second reproduction head that reads the second servo pattern in the plurality of first servo bands, and the second reproduction head portion includes a third reproduction head that reads the first servo pattern and a fourth reproduction head that reads the second servo pattern in the plurality of second servo bands.

* * * * *